United States Patent
Yonemura et al.

(10) Patent No.: US 6,457,785 B1
(45) Date of Patent: *Oct. 1, 2002

(54) BRAKE CONTROL APPARATUS FOR VEHICLE

(75) Inventors: Shuichi Yonemura, Anjo (JP); Yoichi Abe, Kariya (JP); Mamoru Sawada, Yokkaichi (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,980

(22) Filed: Dec. 24, 1996

(30) Foreign Application Priority Data

Dec. 26, 1995 (JP) ................................. 7-339556
Apr. 26, 1996 (JP) ................................. 8-108311

(51) Int. Cl.⁷ ............................................. B60T 13/68
(52) U.S. Cl. ................... 303/182; 303/155; 303/113.4; 303/DIG. 4; 303/9.62
(58) Field of Search ............... 303/DIG. 1–DIG. 4, 303/155, 157, 113.4, 9.62, 113.5, 186, 176, 182

(56) References Cited

U.S. PATENT DOCUMENTS

| 3,360,004 A | 12/1967 | Lewis |
| 3,623,776 A | 11/1971 | Wellman ................... 303/9.62 |
| 4,180,223 A | * 12/1979 | Amberg ..................... 303/182 |
| 5,158,343 A | 10/1992 | Reichelt et al. |
| 5,210,690 A | * 5/1993 | Kageyama et al. ......... 303/182 |
| 5,261,730 A | 11/1993 | Steiner |
| 5,427,442 A | 6/1995 | Heibel |
| 5,492,397 A | 2/1996 | Steiner |
| 5,496,097 A | * 3/1996 | Eckert .................... 303/DIG. 4 |
| 5,556,173 A | 9/1996 | Steiner |

FOREIGN PATENT DOCUMENTS

| GB | 2245323 | * 1/1992 | ............ 303/DIG. 4 |
| GB | 2 283 548 | 5/1995 | |
| GB | 2 283 794 | 5/1995 | |
| JP | 5-294226 | 11/1993 | |
| JP | 6-056023 | 3/1994 | |
| JP | 6-263023 | 9/1994 | |
| JP | 6-329008 | 11/1994 | |
| JP | 7-329754 | 12/1995 | |
| JP | 7-329766 | 12/1995 | |

* cited by examiner

Primary Examiner—Matthew C. Graham
(74) Attorney, Agent, or Firm—Harness, Dickey & Pierce, PLC

(57) ABSTRACT

A characteristic changing device is adopted in the inventive brake control system for the vehicle. The characteristic changing device sets a differential pressure between a first brake hydraulic pressure which is applied to wheel cylinders and a second brake hydraulic pressure which is generated by a master cylinder so that the first brake hydraulic pressure is higher than the second hydraulic pressure when the second brake hydraulic pressure is reduced. Due to the differential pressure set as described above, the first brake hydraulic pressure enough to exhibit effective braking force is kept even if the second brake hydraulic pressure is reduced.

36 Claims, 6 Drawing Sheets

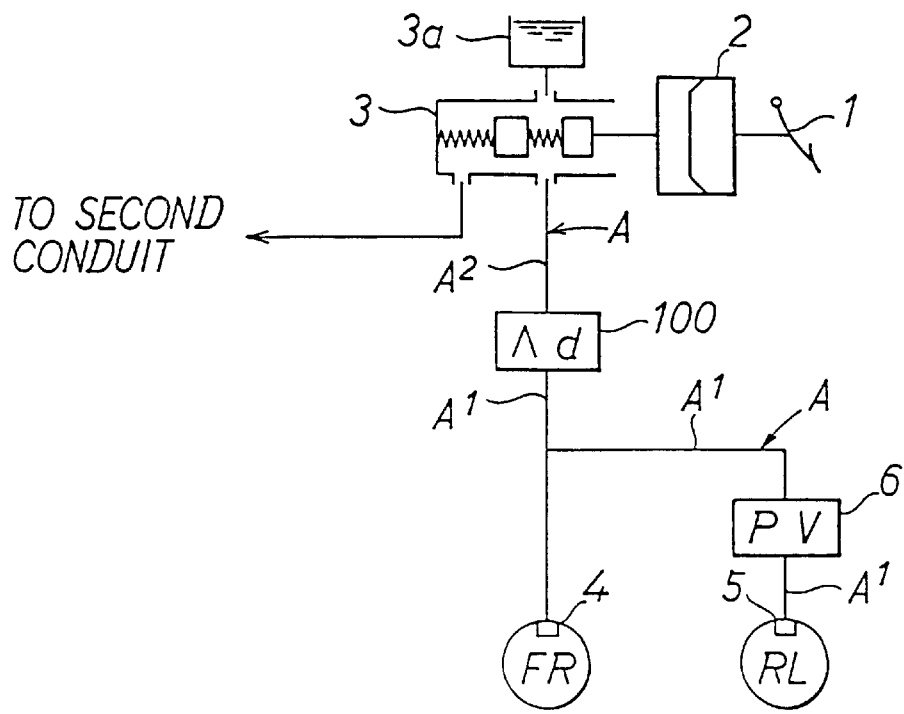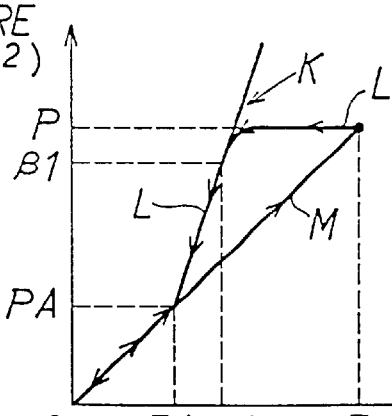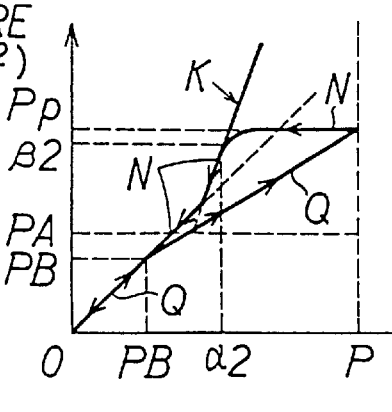

BRAKE CONTROL APPARATUS FOR VEHICLE

CROSS REFERENCE TO RELATED APPLICATION

This application is based upon and claims the benefit of priority of the prior Japanese Patent Applications No. Hei 7-339556 filed on Dec. 26, 1995 and No. Hei 8-108311 filed on Apr. 26, 1996, the contents of which are incorporated herein by reference.

BACKGROUND OF THE INVENTION

1. Field of the Invention

The present invention relates to a brake control apparatus mounted on a vehicle and more particularly to a brake control apparatus which can efficiently decelerate the vehicle.

2. Description of Related Art

A conventional brake control apparatus mounted on a vehicle is normally composed of a brake pedal controlled by a driver, a master cylinder which generates master cylinder pressure in response to the control of the brake pedal, a brake conduit for transmitting this master cylinder pressure, wheel cylinders for receiving the transmitted master cylinder pressure to generate braking force in wheels, and others. The master cylinder pressure is increased/reduced in such a brake control apparatus in response to driver's depressing force to the brake pedal.

In the conventional brake control apparatus, however, the wheel cylinder pressure drops in synchronism with the drop of the master cylinder pressure when the driver weakens the depressing force to the brake pedal. For instance, if the driver weakens the depressing force because the driver is unable to withstand reaction force of the brake pedal caused by increase of the master cylinder pressure when the driver is stepping on the brake pedal hard in order to obtain large braking force, the wheel cylinder pressure drops concurrently with decrease of the depressing force. In such a case, there is a possibility of prolonging an actual stopping distance more than a braking distance which the driver has expected in the beginning of the braking because the braking force may become insufficient against the will of the driver.

It is desirable for the vehicle brake control apparatus to exhibit a high braking performance in compliance to the braking performance which the driver has expected in the beginning of the braking when the driver has started to control the brake pedal.

SUMMARY OF THE INVENTION

Accordingly, it is an object of the present invention to provide a brake control apparatus which can exhibit a braking performance in compliance with a driver's request in the beginning of the braking of a vehicle.

According to the present invention, a characteristic changing device is adopted in a brake control apparatus for a vehicle. That is, a differential pressure is set by the characteristic changing device such that first brake hydraulic pressure which generates braking force for the wheels is higher than second brake hydraulic pressure which is generated by a hydraulic pressure generating source when the second brake hydraulic pressure in the hydraulic pressure generating source is reduced. Due to the differential pressure set as described above, the first brake hydraulic pressure which exhibits enough braking force is kept applying to a wheel braking force generation member even if the second brake hydraulic pressure is reduced in the hydraulic pressure generating source. Thereby, the braking performance expected by a driver in the beginning of the braking of the vehicle is satisfied.

It is also possible to differentiate the characteristic of change of reduction of the second brake hydraulic pressure from that of the first brake hydraulic pressure when the second brake hydraulic pressure is reduced in the hydraulic pressure generating source, while equalizing a change of increase of the second brake hydraulic pressure with that of the first brake hydraulic pressure. That is, the first brake hydraulic pressure is increased with the same response with the pressure-increase in the hydraulic pressure generating source, so that the braking force is assured. In contrast, the braking performance can be satisfied by delaying or attenuating the change of reduction of the first brake hydraulic pressure than the second brake hydraulic pressure when the second brake hydraulic pressure of the hydraulic pressure generating source is reduced.

Further, when the second brake hydraulic pressure in the hydraulic pressure generating source or the first brake hydraulic pressure applied to the wheel braking force generation member becomes less than a predetermined value, it is desirable to equalize the first brake hydraulic pressure with the second brake hydraulic pressure by the characteristic changing device. In this case, the first brake hydraulic pressure may be zeroed at least when the second brake hydraulic pressure in the hydraulic pressure generating source is zeroed. Accordingly, it is possible to inhibit the braking force from being generated reliably when there is no driver's request to apply the braking force to the vehicle.

That is, even if a brake operating member is returned by a driver, the degree of reduction of the first brake hydraulic pressure is lessened for a predetermined period of time, not reducing the first brake hydraulic pressure applied to the wheel braking force generation member as it is, and the degree of the reduction is increased thereafter. Thereby, similarly to the case described above, a braking distance may be shortened while maintaining the high deceleration of the vehicle even if the brake operating member is loosened unintentionally in panic or the like.

When the brake operating member is controlled so as to reduce the second brake hydraulic pressure in the hydraulic pressure generating source, it is also possible to substantially keep the first brake hydraulic pressure by the characteristic changing device for a predetermined period of time. As a result, a braking distance may be shortened while maintaining the high deceleration of the vehicle even if the brake operating member is loosened unintentionally in panic or the like.

When the brake operating member is operated so as to reduce the second brake hydraulic pressure in the hydraulic pressure generating source, the characteristic changing device may execute a change of reduction of the first brake hydraulic pressure applied to the wheel braking force generation member with a delay of time larger than a change of increase of the first brake hydraulic pressure applied to the wheel braking force generation member when the brake operating member is operated so as to increase the second brake hydraulic pressure in the hydraulic pressure generating source.

That is, in the state that the brake operating member is returned, the reduction of the first brake hydraulic pressure is delayed. Thereby, the braking distance may be shortened while maintaining the high deceleration of the vehicle even if the brake operating member is loosened unintentionally in panic or the like.

It is noted that the brake operating member described above is not limited to a brake pedal controlled by the driver. Rather, it also includes a control member of an automatic brake system and the like.

When the driver controls the brake operating member so as to reduce the second brake hydraulic pressure, it is possible to execute a reduction of the first brake hydraulic pressure applied to the wheel braking force generation member with a first pressure-reduction gradient in the initial stage of a pressure reduction operation of the brake operating member. After the initial stage of the pressure reduction operation of the brake operating member, it is possible to execute a reduction of the first brake hydraulic pressure applied to the wheel braking force generation member with a second pressure-reduction gradient which is greater than the first pressure-reduction gradient.

That is, when the brake operating member is returned by the driver, the degree of reduction of the first brake hydraulic pressure is lessened in the initial stage of the pressure-reduction operation of the brake operating member and the degree of reduction is raised thereafter. It also allows the braking distance to be shortened while maintaining the high deceleration of the vehicle even if the brake operating member is loosened unintentionally in panic or the like.

When the driver executes a pressure-reduction operation on the brake operating member, it is possible to cause the characteristic changing device to keep the first brake hydraulic pressure applied to the wheel braking force generation member at a pressure of more than a predetermined value. It also allows the braking distance to be shortened while maintaining the high deceleration of the vehicle even if the brake operating member is loosened unintentionally in panic or the like.

It is noted that a brake booster whose boosting rate is variably controlled may be adopted as the characteristic changing device.

It is also possible to change the characteristic of pressure-reduction by the characteristic changing device only when the deceleration of the vehicle is greater than a predetermined value. This is because it is possible to determine that the reaction force from the brake operating member is large, even if the braking operation is in a panic mode or the like in which a large brake hydraulic pressure needs to be assured when the deceleration of the vehicle is large.

When a brake pedal is used as the brake operating member, it is also possible to change the characteristic of pressure-reduction only when the pedal stroke of the brake pedal is greater than a predetermined value. This is because it is possible to determine that the reaction force from the brake pedal is large, despite it is the braking operation being in a panic mode or the like in which a large brake hydraulic pressure needs to be assured when the pedal stroke is large.

It is also possible to change the characteristic of pressure-reduction by the characteristic changing device only when the depressing force to the brake pedal is greater than a predetermined value. This is because it is possible to determine that the reaction force from the brake pedal is large, despite it is the braking operation being in a panic mode or the like in which a large brake hydraulic pressure needs to be assured when the depressing force to the pedal is large.

It is also possible to change the characteristic of pressure-reduction only when master cylinder pressure is greater than a predetermined value. This is because it is possible to determine that the reaction force from the brake pedal is large, despite it is the braking operation being in a panic mode or the like in which a large brake hydraulic pressure needs to be assured when the master cylinder pressure is large.

It is also possible to change the characteristic of pressure-reduction only when wheel cylinder pressure is greater than a predetermined value. This is because it is possible to determine that the reaction force from the brake pedal is large, despite it is the braking operation being in a panic mode or the like in which a large brake hydraulic pressure needs to be assured when the wheel cylinder pressure is large.

It is also possible to change the characteristic of pressure-reduction only when a wheel deceleration is greater than a predetermined value. This is because it is possible to determine that the reaction force from the brake pedal is large, despite it is the braking operation being in a panic mode or the like in which a large brake hydraulic pressure needs to be assured when the wheel deceleration is large.

It is also possible to change the characteristic of pressure-reduction only when anti-skid control is performed. This is because it is possible to determine that the reaction force from the brake pedal is large during the anti-skid control even though the braking operation being in a panic mode or the like in which a large brake hydraulic pressure needs to be assured.

When the driver executes a pressure-reduction operation to the brake operating member so as to reduce the brake hydraulic pressure, the first brake hydraulic pressure applied to the wheel braking force generation member may be increased by a brake hydraulic pressure increasing device.

That is, the first brake hydraulic pressure is increased once when the brake operating member is returned by the driver. It allows the braking distance to be shortened while maintaining the high deceleration of the vehicle even if the brake operating member is loosened unintentionally in panic or the like.

It is noted that a system such as a traction control system (TRC) may be used to increase the first brake hydraulic pressure Further, the braking distance may be shortened further by increasing the first brake hydraulic pressure until when the brake operating member is completely returned.

Further, according to another preferred embodiment of the present invention, the vehicle is braked by providing braking force to the wheels by the wheel braking force generation member based on the second brake hydraulic pressure generated in the hydraulic pressure generating source in response to the operation of the brake operating member. Then, when the brake operating member is operated so as to reduce the second brake hydraulic pressure, the variation of reduction of the first brake hydraulic pressure applied to the wheel braking force generation member is lessened with respect to the variation of the operation of the brake operating member by the characteristic changing device.

That is, even if the brake operating member is being returned, the degree of reduction of the first brake hydraulic pressure is lessened, not reducing the first brake hydraulic pressure applied to the wheel braking force generation member as it is. It allows the necessary brake hydraulic pressure to be assured even if the brake operating member is loosened unintentionally in panic or the like. Therefore, the braking distance may be shortened while maintaining the high vehicle deceleration.

According to an another preferred embodiment, the vehicle is braked by providing braking force to the wheels by the wheel braking force generation member by receiving the second brake hydraulic pressure generated in the hydraulic pressure generating source in response to the operation of the brake operating member. Then, when the brake operating member is operated so as to reduce the second brake hydraulic pressure, a gradient of reduction of the first brake hydraulic pressure applied to the wheel braking force generation member from the beginning of the pressure-reduction until an elapse of a predetermined time is made smaller than that after the elapse of the predetermined time.

BRIEF DESCRIPTION OF DRAWINGS

These and other objects, features and characteristics of the present invention will be appreciated from a study of the following detailed description, the appended claims, and drawings, all of which form a part of this application. In the drawings:

FIG. 1 is a model diagram showing a structure of a first embodiment of a brake control apparatus to which the present invention is adopted;

FIGS. 2A and 2B are characteristic charts showing a relationship between pressures on the side of a wheel braking generation device and on the side of a brake hydraulic pressure generating source in the first embodiment;

DETAILED DESCRIPTION OF PREFERRED EMBODIMENTS

Figure 3:
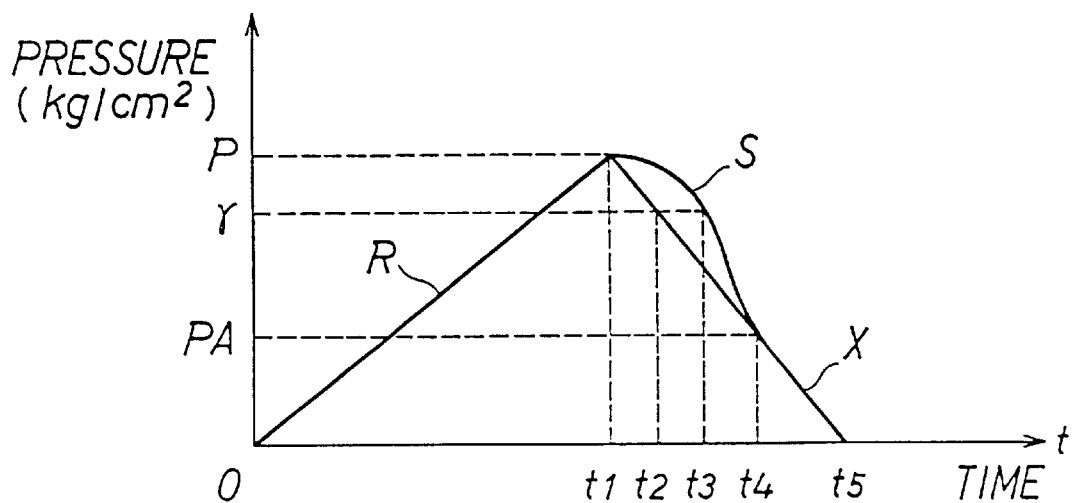
FIG. 3 is a time chart showing elapsed changes of brake hydraulic pressures on the side of the wheel braking generation device and on the side of the brake hydraulic pressure generation source in the first embodiment.

Preferred embodiments of the present invention will be explained below with reference to the drawings.

FIG. 1 is a model diagram of a brake control apparatus of a first embodiment according to the present invention. In the first embodiment, the brake control apparatus is applied to a front-wheel drive vehicle having, so-called, an X-conduit which connects wheel cylinders of a front right wheel and a rear left wheel and connects wheel cylinders of a front left wheel and a rear right wheel.

In FIG. 1, a brake pedal 1 which a driver depresses to apply braking force to the vehicle is connected with a booster 2. Depressing force applied to brake pedal 1 and stroke of brake pedal 1 are transmitted to booster 2. Booster 2 has, at least, a first chamber and a second chamber. The first chamber may be set as an atmospheric chamber and the second as a vacuum chamber for example. Vacuum of the vacuum chamber is caused by using negative pressure caused by an intake manifold of an engine or by a vacuum pump for example. Booster 2 boosts the depressing force of the driver or the pedal stroke with a differential pressure between the atmospheric chamber and the vacuum chamber. Booster 2 is equipped with a push rod and others for transmitting the boosted depressing force or pedal stroke to a master cylinder 3. When the push rod pushes a master piston disposed in master cylinder 3, master cylinder pressure PU generates. It is noted that master cylinder 3 is equipped with its own master reservoir 3a for supplying braking fluid to master cylinder 3 and for reserving excessive braking fluid within master cylinder 3.

Thus, brake pedal 1, booster 2 and master cylinder 3 are provided normally in a vehicle as a brake hydraulic pressure generating source for providing braking force to the vehicle body.

A conduit A which extends from master cylinder 3 is bifurcated on the way. Then, a first wheel cylinder 4 disposed in the front right wheel FR for applying braking force thereto and a second wheel cylinder 5 disposed in the rear left wheel RL for applying braking force thereto are connected at each end of the conduit A. It is noted that these first and second wheel cylinders 4 and 5 correspond to the wheel braking force generation member.

A first proportional control valve 100 is provided in the conduit A between master cylinder 3 and the point where it is bifurcated to first and second wheel cylinders 4 and 5. Cross-over pressure PA is set for this first proportional control valve 100. That is, if wheel cylinder pressure PL applied to each wheel cylinder 4 and 5 is greater than the cross-over pressure PA, brake hydraulic pressure on the side of wheel cylinders 4 and 5 is reduced by a predetermined attenuation ratio when brake fluid flows from the side of each wheel cylinder 4 and 5 to the side of master cylinder 3. The first proportional control valve 100 also transmits brake hydraulic pressure equal to the master cylinder pressure PU regardless of the magnitude of the master cylinder pressure PU when the brake fluid flows from the side of master cylinder 3 to the side of each of the wheel cylinders 4 and 5.

The conduit A may be divided into a first conduit Al from first and second wheel cylinders 4 and 5 to the first proportional control valve 100 and a second conduit A2 from first proportional control valve 100 to master cylinder 3.

A second proportional control valve 6 is disposed in the first conduit Al between first proportional control valve 100 and second wheel cylinder 5. This second proportional control valve 6 is provided to lessen a gradient of pressure-increase of the wheel cylinder pressure in second wheel cylinder 5 compared to a gradient of pressure-increase of the wheel cylinder pressure in first wheel cylinder 4 when increasing the wheel cylinder pressures of first and second wheel cylinders 4 and 5 in response to the master cylinder pressure PU caused by brake pedal 1. That is, because a load movement occurs in the vehicle when braking a vehicle, the rear wheels are apt to be locked as compared to the front wheels. Accordingly, second proportional control valve 6 is normally provided in order to lessen braking force applied to the rear wheels as compared to that applied to the front wheels.

Operations and effects of the first embodiment constructed as described above will be explained with reference to FIGS. 2A, 2B and 3.

At first, change of the wheel cylinder pressure PL1 in first wheel cylinder 4 with respect to a change of increased/reduced master cylinder pressure PU will be explained with reference to FIG. 2A.

FIG. 2A is a graph showing a characteristic of relative changes of the master cylinder pressure PU and the wheel cylinder pressure PL1 in first wheel cylinder 4 when the driver has stepped on brake pedal 1 and the vehicle is braked.

Assume here that the master cylinder pressure PU is increased as the driver has stepped on brake pedal 1 and that it reaches pressure P which is higher than the cross-over pressure PA set for first proportional control valve 100. At this time, the wheel cylinder pressure PL in first wheel cylinder 4 follows the change of the master cylinder pressure PU and thereby increases in a relationship of 1 to 1 like a straight line M in the process when the master cylinder pressure PU increases from 0 to P and the wheel cylinder pressure PL1 from 0 to P.

Then, assume that the driver weakens the depressing force to brake pedal 1 after when the master cylinder pressure PU and the wheel cylinder pressure PL1 have reached the pressure P. At this time, although the master cylinder pressure PU decreases corresponding to the decrease of the depressing force of the driver, the wheel cylinder pressure PL1 shows a change of pressure-reduction slower than that of the master cylinder pressure PU because of first proportional control valve 100. That is, when the master cylinder pressure PU is reduced, the brake fluid flows from the side of the first conduit A1 to the side of the second conduit A2 through first proportional control valve 100. At this time, because the wheel cylinder pressure PL1 on the side of the first conduit A1 is higher than the cross-over pressure PA, first proportional control valve 100 exhibits its effect of attenuating the brake hydraulic pressure. This attenuation of the brake hydraulic pressure is executed based on an attenuation ratio defined for first proportional control valve 100. This attenuation ratio is set like a straight line K in FIG. 2A for example. In this case, because pressure-reduction of the wheel cylinder pressure PL1 is executed in accordance with the gradient of the straight line K, its change of pressure-reduction differs from the change of reduction of the master cylinder pressure PU. That is, while the master cylinder pressure PU is reduced along the straight line M when the driver weakens the depressing force with a constant rate of change for example, the wheel cylinder pressure PL1 is not reduced in the initial stage because the wheel cylinder pressure PL1 changes almost along solid line L up to the cross-over pressure PA. In other words, the wheel cylinder pressure PL1 is almost kept to the pressure P until when the master cylinder pressure PU reaches a predetermined pressure at which the wheel cylinder pressure PL1=P is attenuated by first proportional control valve 100. Then, the wheel cylinder pressure PL1 shifts along the gradient of the solid line L overlapping with the straight line K like from P to β1 when the master cylinder pressure PU shifts from P to α1 for example. As a result, the wheel cylinder pressure PL1 is kept to brake hydraulic pressure higher than the master cylinder pressure PU while the wheel cylinder pressure PL1 is almost kept to the pressure P and while the wheel cylinder pressure PL1 shifts along the straight line K. Thus, the change of reduction of the wheel cylinder pressure PL1 when the master cylinder pressure PU has become pressure greater than the cross-over pressure PA progresses in the domain above the straight line M where the master cylinder pressure PU and the wheel cylinder pressure PL1 have the relationship of 1 to 1 in FIG. 2A.

It is noted that if the master cylinder pressure PU is lowered to the cross-over pressure PA, the wheel cylinder pressure PL1 becomes almost equal to the master cylinder pressure PU. Then, when the master cylinder pressure PU becomes less than the cross-over pressure PA, the change of reduction of the master cylinder pressure Pu coincides with that of the wheel cylinder pressure PL1 because the attenuation effect of first proportional control valve 100 is lost. Further, when the driver keeps his/her leg away from brake pedal 1 and the master cylinder pressure PU becomes zero, the wheel cylinder pressure PL1 is also zeroed. Therefore, if the driver looses his/her intention of applying braking force to the vehicle, the braking force is disappeared without causing dragging of the brake.

Variations of the master cylinder pressure PU and the wheel cylinder pressure PL1 in first wheel cylinder 4 will be explained with reference to FIG. 3. In FIG. 3, when the master cylinder pressure PU and the wheel cylinder pressure PL1 are increased to the brake hydraulic pressure P at time t1 by the fact that the driver steps on brake pedal 1, they change like a straight line R. That is, there is no difference in the pressure-increasing characteristics between the master cylinder pressure PU and the wheel cylinder pressure PL1.

Next, the change of reduction of the wheel cylinder pressure PL1 and that of the master cylinder pressure PU when the wheel cylinder pressure PL1 and the master cylinder pressure PU are reduced from the pressure P during the time t1 and t5 will be explained.

The master cylinder pressure PU is reduced in accordance to a gradient of a straight line X which corresponds to a reduction of the depressing force of the driver to brake pedal 1. In contrast, the wheel cylinder pressure PL1 is reduced like a curve S by the effect of attenuating the pressure from the first conduit A1 to the second conduit A2 due to the first proportional control valve 100 when the master cylinder pressure PU is higher than the cross-over pressure PA set for first proportional control valve 100. Accordingly, while the master cylinder pressure PU reaches pressure Y at time t2, the wheel cylinder pressure PL1 reaches the pressure Y at time t3. Thus, the change of reduction of the wheel cylinder pressure PL1 is slower than that of the master cylinder pressure PU. Therefore, as it is apparent from FIG. 3, the wheel cylinder pressure PL1 is higher than the master cylinder pressure PU until the time t4 when the master cylinder pressure PU and the wheel cylinder pressure PL1 reach the cross-over pressure PA.

It is noted that after the time t4 when the master cylinder pressure PU reaches the cross-over pressure PA, the change of reduction of the master cylinder pressure PU coincides with that of the wheel cylinder pressure PL1. Accordingly, the master cylinder pressure PU becomes equal to the wheel cylinder pressure PL1.

Next, a relationship of relative change of the master cylinder pressure PU and the wheel cylinder pressure PL2 of second wheel cylinder 5 in the rear left wheel RL will be explained with reference to FIG. 2B.

The master cylinder pressure PU which has been attenuated with the predetermined ratio of attenuation by second proportional control valve 6 is applied to second wheel cylinder 5. That is, if cross-over pressure set for second proportional control valve 6 is a pressure PB, the gradient of pressure-increase of the wheel cylinder pressure PL2 decreases like a solid line Q when the master cylinder pressure PU increases above the cross-over pressure PB.

Assume here that with the increase of the master cylinder pressure PU, the master cylinder pressure PU reaches the pressure P and the wheel cylinder pressure PL2 reaches pressure Pp which is higher than the cross-over pressure PA in first proportional control valve 100.

Then, when the depressing force of the driver is reduced and the master cylinder pressure PU is reduced accordingly, the master cylinder pressure PU is reduced along the solid line Q. However, the wheel cylinder pressure PL2 shifts like a solid line N in accordance with the straight line K showing the ratio of attenuation set for first proportional control valve 100. That is, because the brake hydraulic pressure on the side of each of the wheel cylinders 4 and 5 is changed so as to go along the straight line K by the first proportional control valve 100, the wheel cylinder pressure PL2 becomes pressure β2 when the master cylinder pressure PU becomes pressure α2 for example. The pressure β2 is higher than the pressure α2 as shown in FIG. 2B.

Then, when the master cylinder pressure PU and the wheel cylinder pressure PL2 become equal at the cross-over pressure PB, the brake hydraulic pressure of the both changes in a relationship of almost one-to-one along the solid line Q. It is noted that when the master cylinder pressure PU is zeroed, the wheel cylinder pressure PL2 is zeroed as well.

Thus, the wheel cylinder pressure PL1 of first wheel cylinder 4 or the wheel cylinder pressure PL2 of second wheel cylinder 5 is kept higher than the master cylinder pressure PU in a range where the master cylinder pressure PU is larger than the cross-over pressure PA or PB. Therefore, it becomes possible to apply enough braking force to the wheels continuously even when the driver steps on brake pedal 1 the hardest during emergency braking and receives a large reaction force from brake pedal 1. Therefore, it allows the braking force which the driver has expected in starting to step on brake pedal 1 to be maintained.

It is noted that it is possible to set the cross-over pressure PA of first proportional control valve 100 at a relatively high pressure (e.g. 25 Kg/ccm) which might be generated when the driver steps on the pedal hard. In addition, the ratio of attenuation of first proportional control valve 100 may be set arbitrarily. It may be set based on the weight of the vehicle or distribution of weight of the vehicle.

Further, the cross-over pressure PA of first proportional control valve 100 may be set corresponding to the following conditions. When the driver steps on brake pedal 1 lightly just to reduce the vehicle speed, not wanting to stop the vehicle, for example, the wheel cylinder pressures PL1 and PL2 are not kept higher than the master cylinder pressure PU. On the other hand, the wheel cylinder pressures PL1 and PL2 are kept higher than the master cylinder pressure PU when the driver steps on brake pedal 1 hard more or less to stop the vehicle. That is, the cross-over pressure PA may be set around 20 Kg/ccm for example, to satisfy the above-described conditions.

According to the first embodiment, when the driver steps on brake pedal 1 to stop the vehicle and erroneously releases brake pedal 1 at timing of stopping the vehicle at the position exceeding the target position, the wheel cylinder pressures PL1 and PL2 higher than the master cylinder pressure PU remain in the wheel cylinders 4 and 5. Therefore, even if the driver erroneously releases brake pedal 1, the vehicle may be stopped at the target position which the driver has originally intended.

It is noted that although the cross-over pressure PA of first proportional control valve 100 has been set at the pressure higher than the cross-over pressure PB of second proportional control valve 6 as shown in FIGS. 2A and 2B, it is also possible to set the cross-over pressure PA of first proportional control valve 100 at a pressure lower than the cross-over pressure PB of second proportional control valve 6. In this case, it is assumed that the state in which the wheel cylinder pressures PL1 and PL2 are kept higher than the master cylinder pressure PU lasts longer. Accordingly, higher braking force may be expected.

Next, a second embodiment of the present invention will be explained with reference to FIG. 4.

At first, a basic structure of a brake control apparatus of the second embodiment will be explained based on a model diagram of the brake control apparatus shown in FIG. 4.

Figure 4:
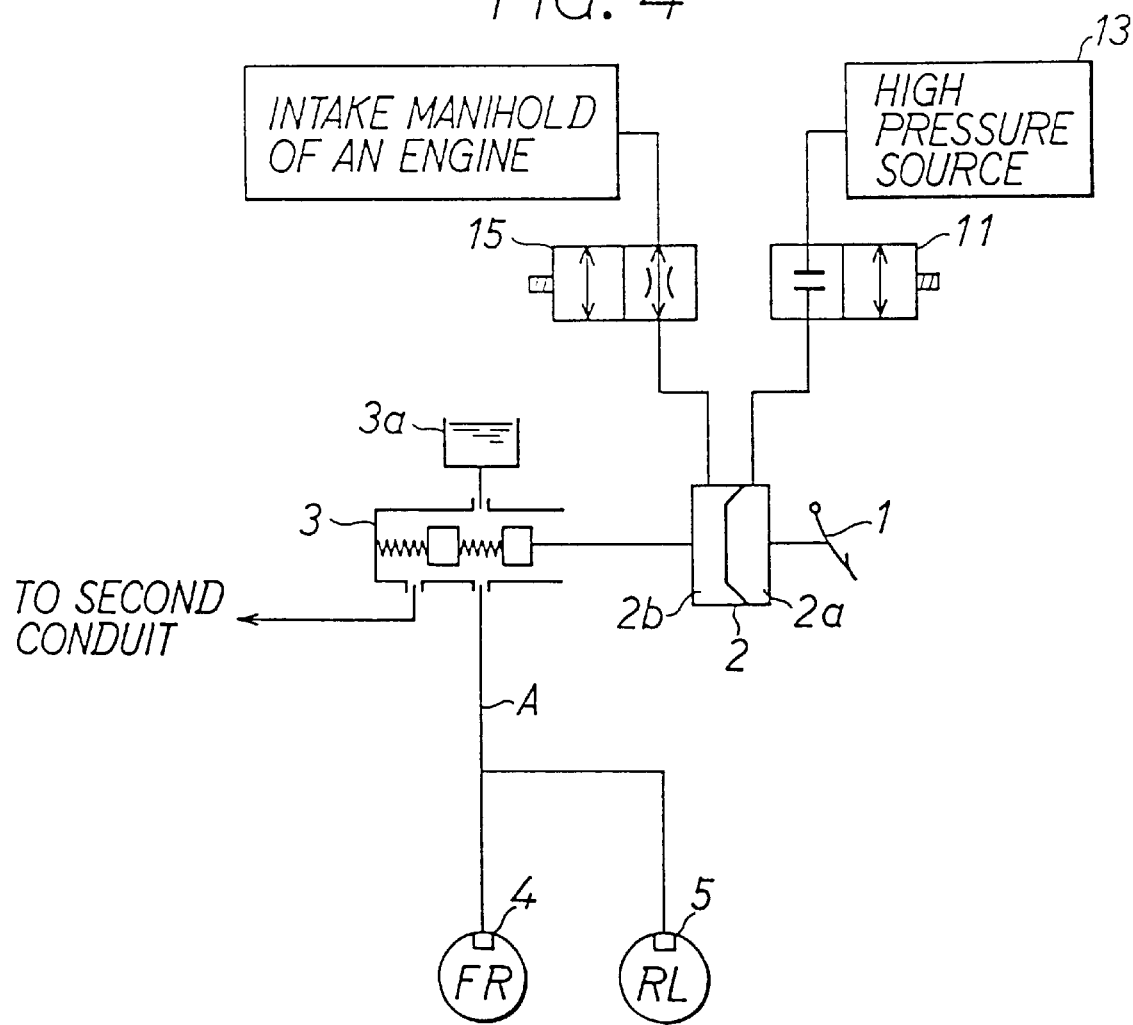
FIG. 4 is a model diagram showing a brake control apparatus of a second embodiment.

In FIG. 4, a brake pedal 1 on which the driver steps to apply braking force to the vehicle is connected with a booster 2 which assists the brake. Accordingly, depressing force applied to brake pedal 1 and pedal strokes are transmitted to booster 2.

Booster 2 has at least two chambers of a first chamber 2a and a second chamber 2b, i.e. a high-pressure chamber and a vacuum chamber. Among them, the high-pressure chamber is connected to a high-pressure source 13 such as a pump and a compressor via a first boost control valve 11 to introduce high pressure. First boost control valve 11 is an electromagnetic valve which is controlled between two positions of communication and shut-off and which is normally set at the shut-off position (when power-off) as shown in FIG.4. Meanwhile, the vacuum chamber is connected to an intake manifold of an engine via a second boost control valve 15 in order to introduce negative pressure of the engine. Second boost control valve 15 is an electromagnetic valve which is controlled among two positions of communication and restriction and which is normally set at the restriction position (when power-off) as shown in FIG. 4.

Accordingly, the depressing force of the driver or the pedal stroke is boosted in booster 2 by differential pressure between the high-pressure chamber and the vacuum chamber and then transmitted to a master cylinder 3.

Booster 2 exhibits its boosting effect by the differential pressure between the high-pressure chamber and the vacuum chamber when brake pedal 1 is operated. However, it may be controlled so as to introduce ambient air to the high-pressure chamber due to a conventional mechanism to cause it to exhibit the boosting effect of a certain degree when the first and second boost controlling valves 11 and 15 are not driven (at the time of no panic braking and the like) even when brake pedal 1 is operated. It is noted that in this case, it is desirable to shut off the communication with the ambient air when first boost control valve 11 is turned on and high pressure is introduced to the high-pressure chamber.

Master cylinder 3 applies brake hydraulic pressure boosted by booster 2 to the whole brake conduit. Master cylinder 3 is equipped with its own master reservoir 3a for supplying brake fluid into master cylinder 3 and for storing the excessive brake fluid.

Master cylinder pressure generated by master cylinder 3 is transmitted to a first conduit A which connects master cylinder 3 with a first wheel cylinder (W/C) 4 and a second wheel cylinder 5. First wheel cylinder 4 is disposed in a front right wheel FR and applies braking force to this wheel. Second wheel cylinder (W/C) 5 is disposed in a rear left wheel RL and applies the braking force to this wheel. Similarly, while the master cylinder pressure is transmitted to a second conduit which connects master cylinder 3 with each wheel cylinder disposed in a front left wheel and a rear right wheel, it will not be described in detail because the same structure with the first conduit may be adopted.

Next, a structure for controlling the first and second boost control valve 11 and 15 will be explained.

Figure 5:
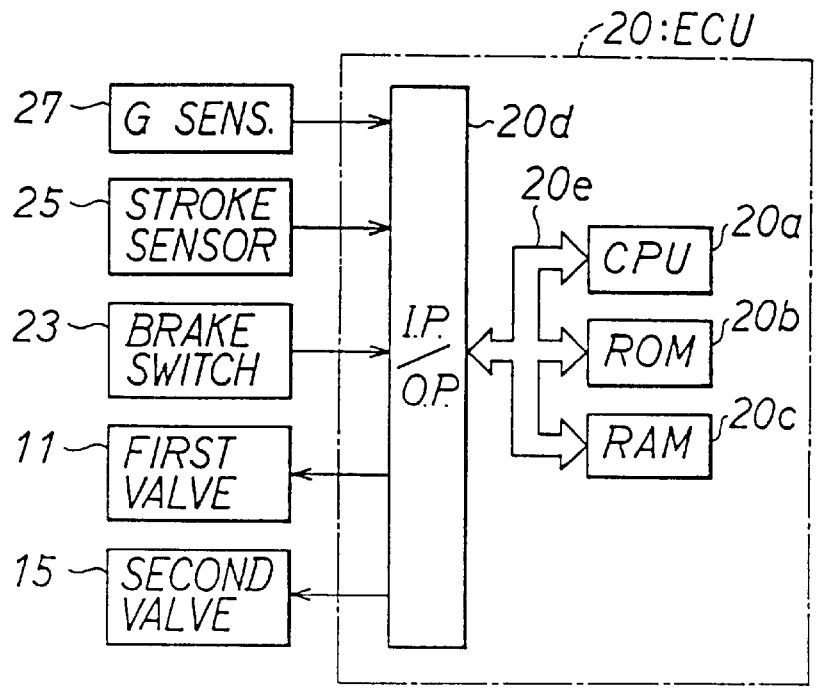
FIG. 5 is a block diagram showing a structure of an electrical circuit of the second embodiment.

Control to drive the first and second boost control valve 11 and 15 is carried out by an electronic control unit (ECU) 20 shown in FIG. 5.

ECU 20 is constructed as a microcomputer comprising a known CPU 20a, a ROM 20b, a RAM 20c, an input/output section 20d, a bus line 20e and others.

Input/output section 20d is connected with a brake switch 23 for detecting that brake pedal 1 has been stepped on, a stroke sensor 25 for detecting a pedal stroke of brake pedal 1 and a G sensor 27 for detecting deceleration G of the vehicle. Further, input/output section 20*d* is connected with first and second boost control valves 11 and 15 in order to drive booster 2 to control the braking force. It is noted that stroke sensor 25 detects a pedal stroke indicating how far brake pedal 1 is being stepped on from a reference position not stepped on.

Figure 6:
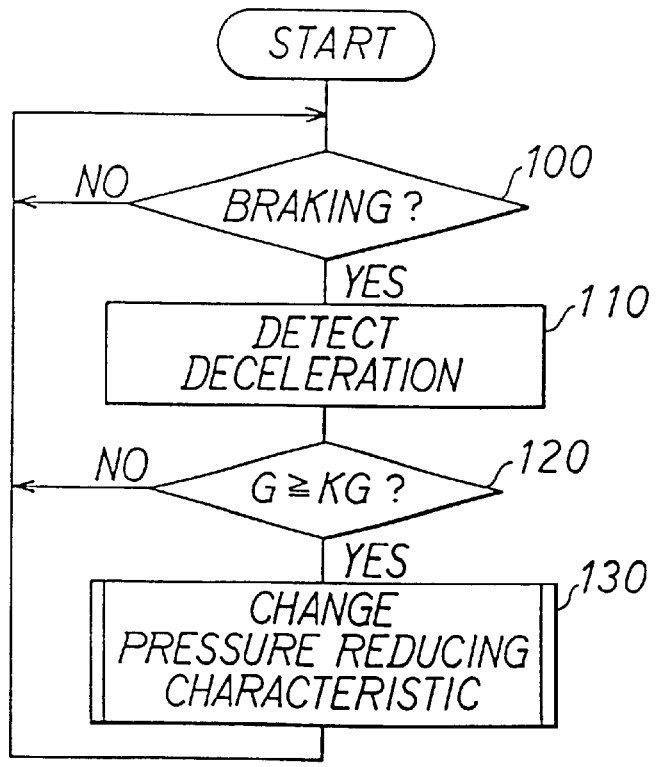
FIG. 6 is a flow chart showing control steps of the second embodiment.

Next, steps for controlling booster 2 carried out in ECU 20 will be explained with reference to a flow chart in FIG. 6.

At first, it is determined whether the braking operation of the vehicle by stepping on brake pedal 1 has been carried out by determining whether brake switch 23 is ON or whether the pedal stroke exceeds a predetermined value in Step 100. If it is determined to be YES in this step, the process advances to Step 110. If it is determined to be NO on the other hand, the same determination is repeated again.

In Step 110, deceleration of the vehicle (vehicular deceleration G) is detected based on signals from G sensor 27.

In Step 120, it is determined whether this vehicular deceleration G exceeds a predetermined value KG (at the time of braking in panic for example). If it is determined to be YES here, the process advances to Step 130. When it is determined to be NO on the other hand, the process returns to the previous Step 100.

In Step 130, a pressure reducing characteristic is changed corresponding to the determinations that the braking operation is being executed and that the deceleration G of the vehicle is greater than the predetermined value KG made in Steps 100 and 120, respectively. Then, the process returns to Step 100.

Next, the process for controlling the pressure reducing characteristic executed in Step 130 will be explained based on a flow chart in FIG. 7.

A variation PS of the pedal stroke is detected based on the signal from stroke sensor 25 in Step 200. This process is carried out to detect a direction of move of brake pedal 1.

It is then determined whether the variation PS of the pedal stroke is less than zero or not in Step 210. If it is determined to be YES in this step, the process advances to Step 220. When it is determined to be NO, the process returns to Step 200. That is, because the variation PS takes a negative value when brake pedal 1 is being returned and takes a positive value when it is being stepped on, the direction of move of brake pedal 1 can be found by determining whether the variation PS of the pedal stroke is positive or negative value.

In Step 220, because the variation PS is negative, i.e. brake pedal 1 is in the state of return, second boost control valve 15 is changed over from the restriction state to the communication state so that the master cylinder pressure will not decrease. Thereby, because the pressure of vacuum chamber 2*b* decreases further, the boosting effect caused by booster 2 is intensified.

In Step 230, because brake pedal 1 is in the state of return, first boost control valve 11 is also changed over from the shut-off state to the communication state so that the master cylinder pressure will not decrease. Thereby, because the pressure of high-pressure chamber 2*a* increases further, the boosting effect of the booster 2 is intensified further.

It is noted that although the boosting effect is increased very much if the both processes of Steps 220 and 230 described above are executed, it is also effective just by executing either one of the processes.

It is then determined in Step S240 whether the processes in Steps 220 and 230 are executed for more than a predetermined period of time. If it is determined to be YES here, the process advances to Step S250 and is determined to be NO, the process returns to S220 to continue the process of increasing the boosting effect. It is noted that it is possible to determine a condition whether brake pedal 1 has been returned by a predetermined stroke or not in Step 240.

Because the boosting effect has been increased for the predetermined period of time, first and second boost control valves 11 and 15 are turned OFF to return booster 2 to the previous state (shown in FIG. 4) in Step 250. Then, the process returns to Step 200.

Figure 8A:
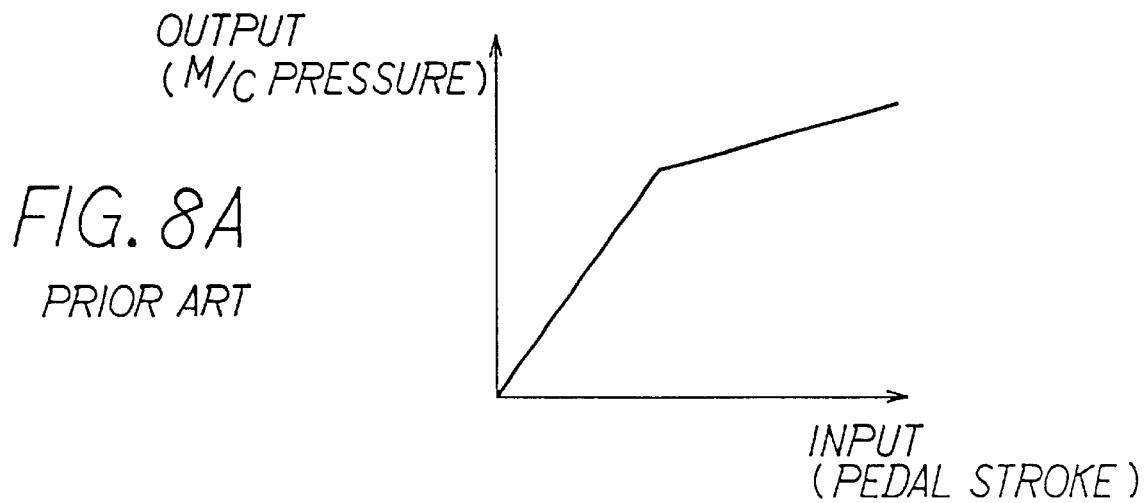
FIGS. 8A and 8B are graphs showing an operation of a prior art booster and that of a booster of the second embodiment, respectively.
Figure 8B:
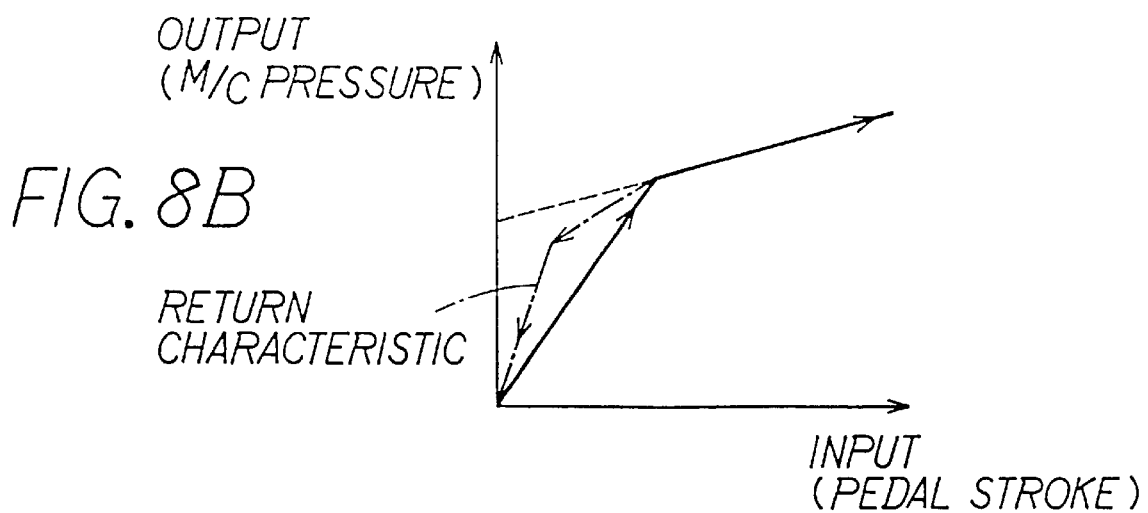
Figure 9A:
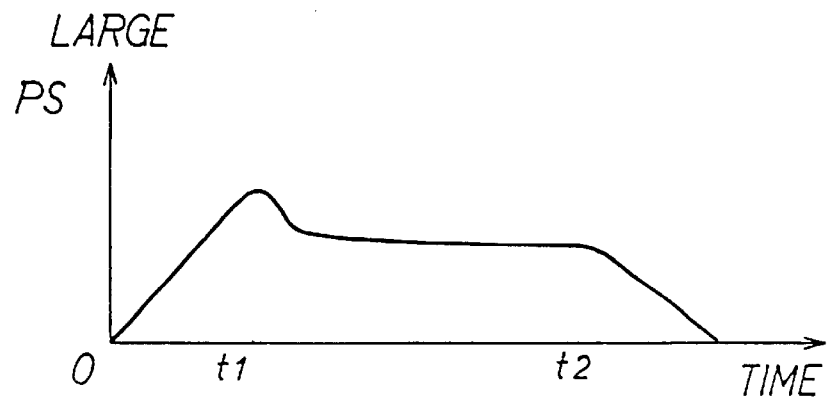
FIGS. 9A to 9C are graphs showing effects caused by controlling the brake booster.

Next, the operation and effect of the above-mentioned control process will be explained based on graphs in FIGS. 8A, 8B and 9A to 9C. The graphs in FIGS. 8A and 8B show characteristics of booster 2. The graphs in FIGS. 9A to 9C show variations of the pedal stroke, the wheel cylinder pressure (W/C pressure) and the vehicular deceleration G.

As shown in FIG. 8A, a prior art booster increases its output (pressure of a master cylinder) rapidly until an input (a pedal stroke) reaches a certain value. However, the rate of increase of the output (the master cylinder pressure) reduces thereafter. This variation also occurs similarly in the case when brake pedal 1 is returned.

In contrast, in a case of the second embodiment, booster 2 has the same input-output relationship as the prior art when brake pedal 1 is stepped on as shown in FIG. 8B. However, the output (the master cylinder pressure) is decreased slowly as shown by a dashed line in FIG. 8B so that a large output can be obtained as compared to the prior art with respect to the input (as shown by a dashed line in FIG. 8B) when brake pedal 1 is returned. That is, the gradient of pressure-reduction is moderate in a certain range of the pedal stroke when brake pedal 1 is returned. It is noted that the domain below a broken line in FIG. 8B is a controllable domain.

Figure 9B:
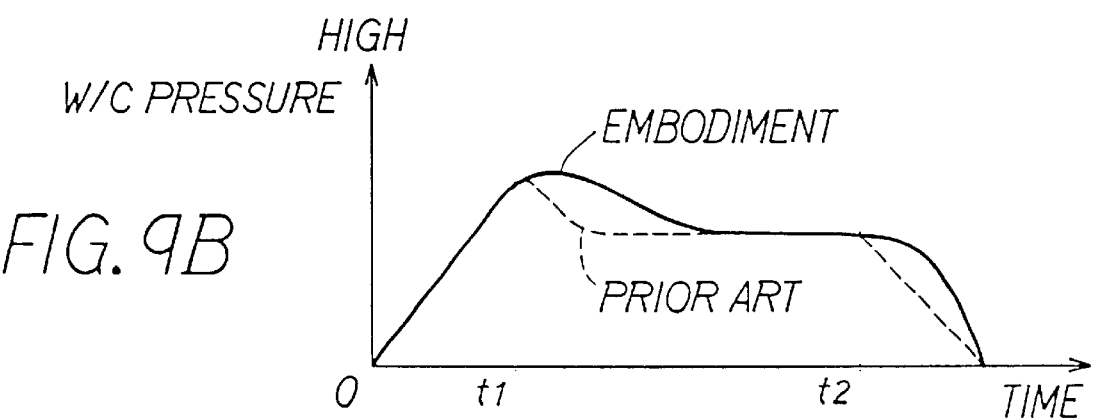
Figure 9C:
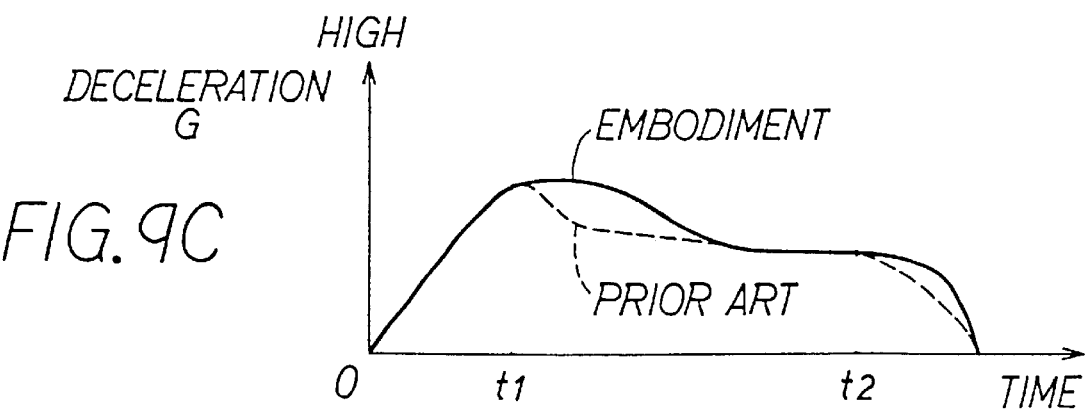

Then, effects as shown in FIGS. 9B and 9C can be obtained by controlling booster 2 as described above.

That is, when brake pedal 1 is stepped on to a certain stroke in panic or the like, a phenomenon that brake pedal 1 is pushed back slightly by the reaction force caused by the master cylinder pressure PU occurs at time t1.

In the prior art, because the wheel cylinder pressure also decreases corresponding to the return of brake pedal 1 at this time as shown by a broken line of the W/C pressure in FIG. 9B, the vehicular deceleration G also decreases as a result, as shown by a broken line in FIG. 9C. That is, a phenomenon so called a slip-out of the deceleration G occurs and the braking force may drop even though it is in panic.

Figure 7:
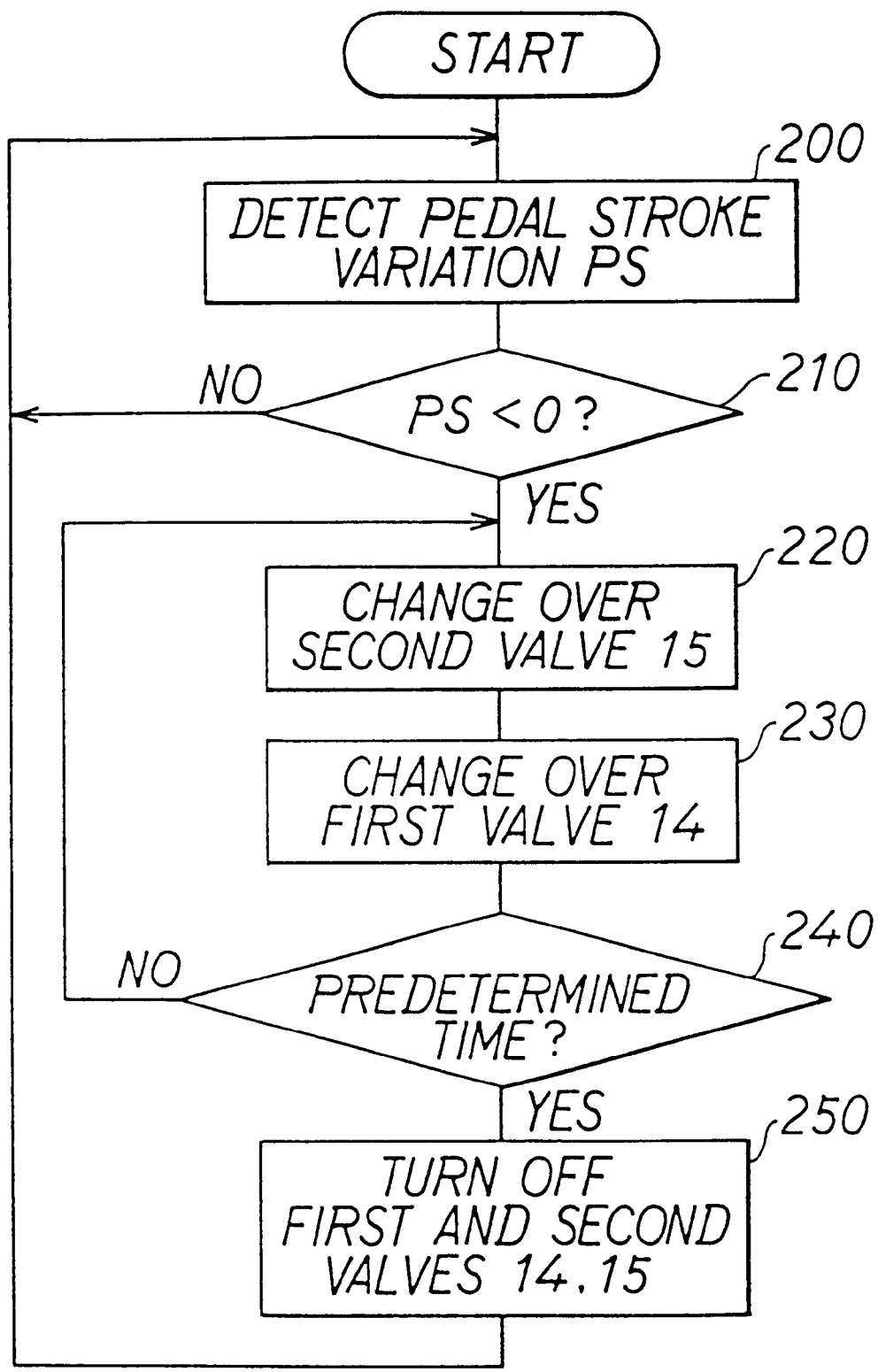
FIG. 7 is a flow chart showing control steps for controlling a brake booster in the second embodiment.

In contrast, in the second embodiment, first and second boost control valves 11 and 15 are controlled to drive booster 2 as shown in Steps 220 and 230 in FIG. 7 to increase the boosting effect when such a return of brake pedal 1 is detected. Accordingly, even if brake pedal 1 is returned by the reaction force caused by the master cylinder pressure, the wheel cylinder pressure will not drop immediately as shown by a solid line in FIG. 9B. As a result, because the vehicular deceleration G does not drop, no phenomenon of the slip-out of the deceleration G occurs. Further, it exhibits a remarkable effect that it can keep the high vehicular deceleration G and can shorten the braking distance even when brake pedal 1 is released unintentionally in panic or the like.

This kind of operation is carried out also when brake pedal 1 is intentionally returned. When brake pedal 1 is loosened from time t2 for example, the wheel cylinder pressure decreases rapidly and the vehicular deceleration G decreases rapidly in the prior art as shown by broken lines in FIGS. 9B and 9C. However, the wheel cylinder pressure is decreased with a certain degree of delay and the vehicular deceleration G decreases moderately in the second embodiment as shown in solid lines in FIGS. 9B and 9C. Accordingly, it allows the smooth deceleration while maintaining necessary braking force when brake pedal 1 is loosened.

The present invention is not limited only to the embodiments described above. Rather, it may be modified variously as described below. For example, second proportional control valve 6 which has been provided in the first embodiment may be eliminated depending on a type of vehicle.

Further, the present invention is applicable to various brake control apparatus regardless of driving systems and conduit connecting formation. For example, it is applicable to a four wheel drive vehicle of a T—T conduit formation which connects a front right wheel cylinder with a front left wheel cylinder and connects a rear right wheel cylinder with a rear left wheel cylinder.

Still further, although the brake hydraulic pressure has been generated by master cylinder 3 through brake pedal 1 controlled by the driver, the present invention may be applied to an automatic brake apparatus which actuates the brake regardless of whether or not brake pedal 1 is stepped on by the driver when the distance between cars becomes less than a predetermined distance depending on the vehicle speed for example. In this case, a pump for generating hydraulic pressure to execute the automatic brake may be adopted as a brake hydraulic pressure generating device instead of brake pedal 1, master cylinder 3 and others. The same operation and effect with the above-mentioned embodiments may be obtained also in this case.

It is noted that although it has been arranged so as to be able to keep the both wheel cylinder pressures PL1 and PL2 in the front right wheel FR and the rear left wheel RL to be higher than the master cylinder pressure PU in the first embodiment, their characteristics of pressure-reduction may be changed so as to keep the wheel cylinder pressure PL2 of the rear left wheel RL higher than the master cylinder pressure PU at the time of pressure-reduction, while keeping the wheel cylinder pressure PL1 of the front right wheel FR lower than the master cylinder pressure PU, for example. In this case, if the driver loosens brake pedal 1 when a diving behavior occurs in the vehicle due to the hard braking operation on a road of high friction coefficient ($\mu$) for example, the diving behavior is terminated quickly because the wheel cylinder pressure PL1 of the front right wheel is freed quickly. Then, because the wheel cylinder pressure PL2 of the rear left wheel is kept higher than the master cylinder pressure PU, the braking force requested in the beginning of the braking of the vehicle is fully attained.

Further, although brake pedal 1 which is controlled by the driver has been exemplified as a brake operating device in the second embodiment, the second embodiment may be applied also to the brake operating device in the automatic brake apparatus.

Still further, although the condition that the value of the vehicular deceleration G detected by G sensor 27 should be more than the predetermined value KG in Step 120 as the condition for driving booster 2 in the second embodiment, the following conditions may be adopted instead of that:

(1) Deceleration G of a wheel may be calculated based on outputs of a wheel speed sensor to make the same determination based on the wheel deceleration G;

(2) The pedal stroke may be detected by a stroke sensor 25 to adopt a condition that the pedal stroke is greater than a predetermined value;

(3) Depressing force to brake pedal 1 may be detected by a pressure sensor to adopt a condition that the depressing force is greater than a predetermined value;

(4) The master cylinder pressure may be detected by a pressure sensor to adopt a condition that the master cylinder pressure is greater than a predetermined value;

(5) The wheel cylinder pressure may be detected by a pressure sensor to adopt a condition that the wheel cylinder pressure is greater than a predetermined value; and (6) It may be determined whether or not the vehicle is under anti-skid control to adopt that it is under the anti-skid control as the condition.

It is noted that it is preferable to combine a plurality of determination conditions described above in order to assure the determination of the condition.

Although the characteristic of pressure-reduction of the brake hydraulic pressure is controlled so that the rate of pressure-reduction becomes small in panic or the like in the second embodiment, the brake hydraulic pressure may be kept without reducing the pressure, or the brake hydraulic pressure may be increased in contrast by increasing the boosting effect for a predetermined period of time. It also allows the high braking force to be assured in panic or the like and the purpose of shortening the braking distance to be achieved.

Here, it has a merit that a feeling of constant deceleration and braking force may be generated by keeping the brake hydraulic pressure at a certain value. It is also preferable because it has a merit that the deceleration is gradually increased and the driver can release the brake by increasing the brake hydraulic pressure (the driver can stop the vehicle with a sufficient margin until just before the stop).

Further, the brake control apparatus of the first and second embodiments may be used together with existing brake pressure control systems such as ABS and TRC. In this case, even if a slip ratio of a wheel is increased by the brake control apparatus of the first and second embodiments by any chance, the slip ratio is adequately controlled by the ABS.

While the described embodiments represent the preferred forms of the present invention, it is to be understood that modifications will occur to those skilled in that art without departing from the spirit of the invention. The scope of the invention is therefore to be determined by the appended claims.

What is claimed is:

1. A brake control apparatus for a vehicle, comprising:
   an operating member to cause brake hydraulic pressure to generate;
   a hydraulic pressure generating source for generating the brake hydraulic pressure in response to an operation of the operating member;
   a wheel braking force generation member for providing braking force to at least one wheel of the vehicle by receiving the brake hydraulic pressure from the hydraulic pressure generating source with the wheel braking force generation member;
   a conduit which connects the hydraulic pressure generating source with the wheel braking generation force generation member; and
   characteristic changing means for reducing the brake hydraulic pressure applied to the wheel braking force generation member at a lower rate than a variation rate of a return movement of the operating member during a portion of a time when the operating member is operated so as to reduce the brake hydraulic pressure in the hydraulic pressure generating source, and for increasing the brake hydraulic pressure applied to the wheel braking force generation member at the same rate as a variation rate of a depressing movement of the operating member so that a constant increasing rate pressure is applied to the wheel braking force generation member when the operating member is operated so as to constantly increase the brake hydraulic pressure in the hydraulic pressure generating source.

2. The brake control apparatus according to claim 1, wherein the characteristic changing means includes a brake booster whose boosting rate is variably controlled.

3. The brake control apparatus according to claim 1, wherein the characteristic changing means executes its function when deceleration of the vehicle is greater than a predetermined value.

4. The brake control apparatus according to claim 1, wherein the operating member is a brake pedal which is operated by a driver, and the characteristic changing means executes its function when a pedal stroke of the brake pedal is greater than a predetermined value.

5. The brake control apparatus according to claim 1, wherein the operating member is a brake pedal which is operated by a driver, and the characteristic changing means executes its function when a depressing force to the brake pedal is greater than a predetermined value.

6. The brake control apparatus according to claim 1, wherein the hydraulic pressure generating source includes a master cylinder, and the characteristic changing means executes its function when a master cylinder pressure is greater than a predetermined value.

7. The brake control apparatus according to claim 1, wherein the braking force generation member includes a wheel cylinder, and the characteristic changing means executes its function when a wheel cylinder pressure is greater than a predetermined value.

8. The brake control apparatus according to claim 1, wherein the characteristic changing means executes its function when a deceleration of the at least one wheel is greater than a predetermined value.

9. The brake control apparatus according to claim 1, further comprising:
an anti-skid control device which executes anti-skid control,
wherein the characteristic changing means executes its function when anti-skid control is being carried out.

10. A brake control apparatus for a vehicle, comprising:
an operating member for causing brake hydraulic pressure to generate;
a hydraulic pressure generating source for generating the brake hydraulic pressure in response to an operation of the operating member;
a wheel braking force generation member for providing braking force to at least one wheel of the vehicle by receiving the brake hydraulic pressure from the hydraulic pressure generating source;
a conduit which connects the hydraulic pressure generating source with the wheel braking force generation member; and
characteristic changing means for keeping the brake hydraulic pressure applied to the braking force generation member substantially at constant in spite of a return movement of the operating member during a predetermined period of time after the operating member is operated so as to reduce the brake hydraulic pressure in the hydraulic pressure generating source, and for increasing the brake hydraulic pressure applied to the wheel braking force generation member at the same rate as a variation rate of a depressing movement of the operating member so that a constant increasing rate pressure is applied to the wheel braking force generation member when the operating member is operated so as to constantly increase the brake hydraulic pressure in the hydraulic pressure generating source.

11. The brake control apparatus according to claim 10, wherein the characteristic changing means includes a brake booster whose boosting rate is variably controlled.

12. The brake control apparatus according to claim 10, wherein the characteristic changing means executes its function when deceleration of the vehicle is greater than a predetermined value.

13. The brake control apparatus according to claim 10, wherein the operating member is a brake pedal which is operated by a driver, and the characteristic changing means executes its function when a pedal stroke of the brake pedal is greater than a predetermined value.

14. The brake control apparatus according to claim 10, wherein the operating member is a brake pedal which is operated by a driver, and the characteristic changing means executes its function when a depressing force to the brake pedal is greater than a predetermined value.

15. The brake control apparatus according to claim 10, wherein the hydraulic pressure generating source includes a master cylinder, and the characteristic changing means executes its function when a master cylinder pressure is greater than a predetermined value.

16. The brake control apparatus according to claim 10, wherein the braking force generation member includes a wheel cylinder, and the characteristic changing means executes its function when a wheel cylinder pressure is greater than a predetermined value.

17. The brake control apparatus according to claim 10, wherein the characteristic changing means executes its function when a deceleration of the at least one wheel is greater than a predetermined value.

18. The brake control apparatus according to claim 10, further comprising;
an anti-skid control device which executes anti-skid control,
wherein the characteristic changing means executes its function when anti-skid control is being carried out.

19. A brake control apparatus for a vehicle, comprising:
an operating member for causing brake hydraulic pressure to generate based on an operation of a driver;
a brake hydraulic pressure generating device which generates the brake hydraulic pressure in response to an operation of the operating member;
a wheel braking force generation member for providing braking force to at least one wheel of the vehicle by receiving the brake hydraulic pressure from the brake hydraulic pressure generating device;
a conduit which connects the brake hydraulic pressure generating device with the wheel braking force generation member; and
increasing means for increasing the brake hydraulic pressure applied to the wheel braking force generation member with a constant increasing rate pressure the same as that in the hydraulic pressure generating device when the driver operates the operating member so as to increase the brake hydraulic pressure in the hydraulic pressure generating device, and further increasing the brake hydraulic pressure applied to the wheel braking force generation member when the driver operates the operating member so as to reduce the brake hydraulic pressure in the brake hydraulic pressure generating device.

20. The brake control apparatus according to claim 19, wherein the increasing means includes a brake booster whose boosting rate is variably controlled.

21. The brake control apparatus according to claim 19, wherein the increasing means executes its function when deceleration of the vehicle is greater than a predetermined value.

22. The brake control apparatus according to claim 19, wherein the operating member is a brake pedal which is operated by a driver, and the increasing means executes its function when a pedal stroke of the brake pedal is greater than a predetermined value.

23. The brake control apparatus according to claim 19, wherein the operating member is a brake pedal which is operated by a driver, and the increasing means executes its function when a depressing force to the brake pedal is greater than a predetermined value.

24. The brake control apparatus according to claim 19, wherein the hydraulic pressure generating device includes a master cylinder, and the increasing means executes its function when a master cylinder pressure is greater than a predetermined value.

25. The brake control apparatus according to claim 19, wherein the braking force generation member includes a wheel cylinder, and the increasing means executes its function when a wheel cylinder pressure is greater than a predetermined value.

26. The brake control apparatus according to claim 19, wherein the increasing means executes its function when a deceleration of the at least one wheel is greater than a predetermined value.

27. The brake control apparatus according to claim 19, further comprising;
an anti-skid control device which executes anti-skid control,
wherein the increasing means executes its function when anti-skid control is being carried out.

28. A brake control apparatus for a vehicle, comprising:
an operating member to cause brake hydraulic pressure to generate;
a hydraulic pressure generating source for generating the brake hydraulic pressure in response to an operation of the operating member;
a wheel braking force generation member for providing braking force to at least one wheel of the vehicle by receiving the brake hydraulic pressure from the hydraulic pressure generating source;
a conduit which connects the hydraulic pressure generating source with the wheel braking force generation member; and
characteristic changing means for reducing the brake hydraulic pressure applied to the wheel braking force generation member at a lower rate than a rate of reduction of the brake hydraulic pressure in the hydraulic pressure generating source during a portion of a time when the operating member is operated so as to reduce the brake hydraulic pressure in the hydraulic pressure generating sources and for increasing the brake hydraulic pressure applied to the wheel braking force generation member with a constant increasing rate when the operating member is operated so as to increase the brake hydraulic pressure in the hydraulic pressure generating source;
wherein the characteristic changing means executes its function when deceleration of the vehicle is greater than a predetermined value.

29. A brake control apparatus for a vehicle, comprising:
an operating member to cause brake hydraulic pressure to generate;
a hydraulic pressure generating source for generating the brake hydraulic pressure in response to an operation of the operating member;
a wheel braking force generation member for providing braking force to at least one wheel of the vehicle by receiving the brake hydraulic pressure from the hydraulic pressure generating source;
a conduit which connects the hydraulic pressure generating source with the wheel braking force generation member; and
characteristic changing means for reducing the brake hydraulic pressure applied to the wheel braking force generation member at a lower rate than a rate of reduction of the brake hydraulic pressure in the hydraulic pressure generating source during a portion of a time when the operating member is operated so as to reduce the brake hydraulic pressure in the hydraulic pressure generating source. and for increasing the brake hydraulic pressure applied to the wheel braking force generation member with a constant increasing rate when the operating member is operated so as to increase the brake hydraulic pressure in the hydraulic pressure generating source;
wherein the operating member is a brake pedal which is operated by a driver, and the characteristic changing means executes its function when a pedal stroke of the brake pedal is greater than a predetermined value.

30. A brake control apparatus for a vehicle, comprising:
an operating member to cause brake hydraulic pressure to generate;
a hydraulic pressure generating source for generating the brake hydraulic pressure in response to an operation of the operating member;
a wheel braking force generation member for providing braking force to at least one wheel of the vehicle by receiving the brake hydraulic pressure from the hydraulic pressure generating source;
a conduit which connects the hydraulic pressure generating source with the wheel braking force generation member; and
characteristic changing means for reducing the brake hydraulic pressure applied to the wheel braking force generation member at a lower rate than a rate of reduction of the brake hydraulic pressure in the hydraulic pressure generating source during a portion of a time when the operating member is operated -so as to reduce the brake hydraulic pressure in the hydraulic pressure generating source. and for increasing the brake hydraulic pressure applied to the wheel braking force generation member with a constant increasing rate when the operating member is operated so as to increase the brake hydraulic pressure in the hydraulic pressure generating source;
wherein the operating member is a brake pedal which is operated by a driver, and the characteristic changing means executes its function when a depressing force to the brake pedal is greater than a predetermined value.

31. A brake control apparatus for a vehicle, comprising:
an operating member to cause brake hydraulic pressure to generate;
a hydraulic pressure generating source for generating the brake hydraulic pressure in response to an operation of the operating member;

a wheel braking force generation member for providing braking force to at least one wheel of the vehicle by receiving the brake hydraulic pressure from the hydraulic pressure generating source;

a conduit which connects the hydraulic pressure generating source with the wheel braking force generation member; and characteristic changing means for reducing the brake hydraulic pressure applied to the wheel braking force generation member at a lower rate than a rate of reduction of the brake hydraulic pressure in the hydraulic pressure generating source during a portion of a time when the operating member is operated so as to reduce the brake hydraulic pressure in the hydraulic pressure generating source, and for increasing the brake hydraulic pressure applied to the wheel braking force generation member with a constant increasing rate when the operating member is operated so as to increase the brake hydraulic pressure in the hydraulic pressure generating source;

wherein the hydraulic pressure generating source includes a master cylinder, and the characteristic changing means executes its function when a master cylinder pressure is greater than a predetermined value.

32. A brake control apparatus for a vehicle, comprising:

an operating member to cause brake hydraulic pressure to generate;

a hydraulic pressure generating source for generating the brake hydraulic pressure in response to an operation of the operating member;

a wheel braking force generation member for providing braking force to at least one wheel of the vehicle by receiving the brake hydraulic pressure from the hydraulic pressure generating source;

a conduit which connects the hydraulic pressure generating source with the wheel braking force generation member; and characteristic changing means for reducing the brake hydraulic pressure applied to the wheel braking force generation member at a lower rate than a rate of reduction of the brake hydraulic pressure in the hydraulic pressure generating source during a portion of a time when the operating member is operated so as to reduce the brake hydraulic pressure in the hydraulic pressure generating sources and for increasing the brake hydraulic pressure applied to the wheel braking force generation member with a constant increasing rate when the operating member is operated so as to increase the brake hydraulic pressure in the hydraulic pressure generating source;

wherein the braking force generation member includes a wheel cylinder, and the characteristic changing means executes its function when a wheel cylinder pressure is greater than a predetermined value.

33. A brake control apparatus for a vehicle, comprising:

an operating member to cause brake hydraulic pressure to generate;

a hydraulic pressure generating source for generating the brake hydraulic pressure in response to an operation of the operating member;

a wheel braking force generation member for providing braking force to at least one wheel of the vehicle by receiving the brake hydraulic pressure from the hydraulic pressure generating source;

a conduit which connects the hydraulic pressure generating source with the wheel braking force generation member; and characteristic changing means for reducing the brake hydraulic pressure applied to the wheel braking force generation member at a lower rate than a rate of reduction of the brake hydraulic pressure in the hydraulic pressure generating source during a portion of a time when the operating member is operated so as to reduce the brake hydraulic pressure in the hydraulic pressure generating sources and for increasing the brake hydraulic pressure applied to the wheel braking force generation member with a constant increasing rate when the operating member is operated so as to increase the brake hydraulic pressure in the hydraulic pressure generating source;

wherein the characteristic changing means executes its function when a deceleration of the at least one wheel is greater than a predetermined value.

34. A brake control apparatus for a vehicle, comprising:

an operating member for generating a pedal input responsive to a brake pedal movement;

characteristic changing means for generating an pedal output whose value is changeable from that of the pedal input;

a wheel braking force generating member for generating brake hydraulic pressure in response to the value of the pedal output;

a wheel braking force generation member for providing braking force to at least a wheel of the vehicle by receiving the brake hydraulic pressure from the hydraulic pressure generating source; and a conduit which connects the hydraulic pressure generating source with the wheel braking force generation member, wherein the characteristic changing means is operative to increase the value of the pedal output at a constant increasing rate same as that of the value of the pedal input when the operating member is operated to constantly increase the value of the pedal input so that the brake hydraulic pressure applied to the wheel braking force generation member is increased at a constant increasing rate same as that of the value of the pedal input and, further, to reduce the value of the pedal output at a reducing rate lower than that of the pedal input during a predetermined time from a start when the operating member is operated to reduce the value of the pedal input so that a reduction of the brake hydraulic pressure applied to the wheel braking force generation member is retarded from the reduction of the value of the pedal input.

35. A brake control apparatus for a vehicle, comprising:

an operating member for generating a pedal input responsive to a brake pedal movement;

characteristic changing means for generating an pedal output whose value is changeable from that of the pedal input;

a wheel braking force generating member for generating brake hydraulic pressure in response to the value of the pedal output;

a wheel braking force generation member for providing braking force to at least a wheel of the vehicle by receiving the brake hydraulic pressure from the hydraulic pressure generating source; and a conduit which connects the hydraulic pressure generating source with the wheel braking force generation member, wherein the characteristic changing means is operative to increase the value of the pedal output at a constant increasing rate same as that of the value of the pedal input when the operating member is operated to constantly increase the value of the pedal input so that the brake hydraulic pressure applied to the wheel braking force generation member is increased at a constant increasing rate same as that of the value of the pedal input and, further, to keep the value of the pedal output substantially at constant during a predetermined time from a start when the operating member is operated to reduce the value of the pedal input so that a reduction of the brake hydraulic pressure applied to the wheel braking force generation member is withheld.

36. A brake control apparatus for a vehicle, comprising:

an operating member for generating a pedal input responsive to a brake pedal movement;

characteristic changing means for generating an pedal output whose value is changeable from that of the pedal input;

a wheel braking force generating member for generating brake hydraulic pressure in response to the value of the pedal output;

a wheel braking force generation member for providing braking force to at least a wheel of the vehicle by receiving the brake hydraulic pressure from the hydraulic pressure generating source; and a conduit which connects the hydraulic pressure generating source with the wheel braking force generation member, wherein the characteristic changing means is operative to increase the value of the pedal output at a constant increasing rate same as that of the value of the pedal input when the operating member is operated to constantly increase the value of the pedal input so that the brake hydraulic pressure applied to the wheel braking force generation member is increased at a constant increasing rate same as that of the value of the pedal input and, further, to increase the value of the pedal output during a predetermined time from a start when the operating member is operated to reduce the value of the pedal input so that the brake hydraulic pressure applied to the wheel braking force generation member is further increased.

* * * * *